(No Model.)
W. DIEBEL.
INSTRUMENT FOR CUTTING OR GRINDING EMERY WHEELS.
No. 401,823. Patented Apr. 23, 1889.
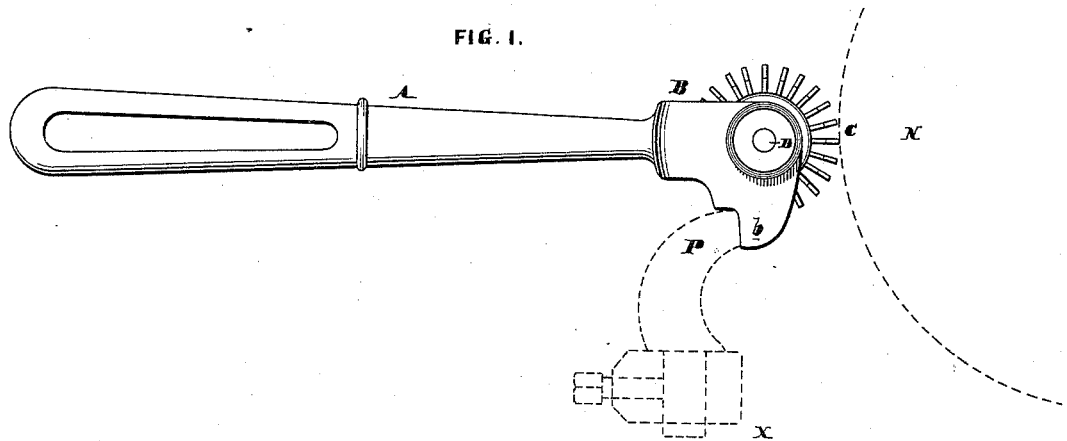
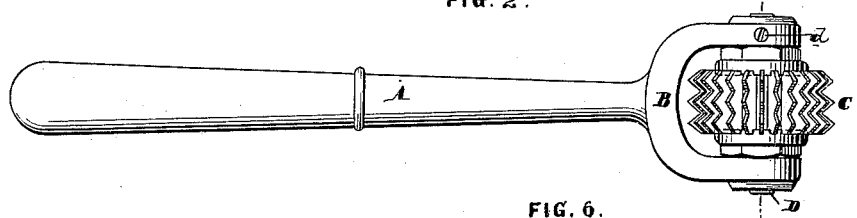
FIG. 3.
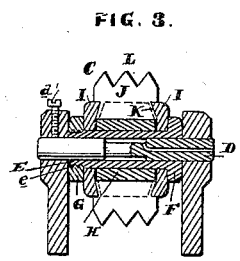
FIG. 6.
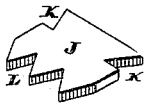
FIG. 4.
FIG. 5.
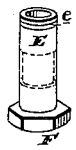
FIG. 8.
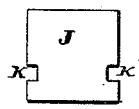
FIG. 7.
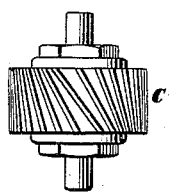
FIG. 9.
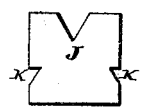
Attest:
Henry Drury
E. M. Breckinridge
Inventor:
Wm. Diebel
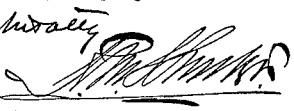

UNITED STATES PATENT OFFICE.

WILLIAM DIEBEL, OF PHILADELPHIA, PENNSYLVANIA.

INSTRUMENT FOR CUTTING OR GRINDING EMERY-WHEELS.

SPECIFICATION forming part of Letters Patent No. 401,823, dated April 23, 1889.

Application filed January 21, 1888. Serial No. 261,532. (No model.)

*To all whom it may concern:*

Be it known that I, WILLIAM DIEBEL, of the city and county of Philadelphia, and State of Pennsylvania, have invented an Improvement in Instruments for Cutting or Grinding Emery-Wheels, of which the following is a specification.

My invention relates to tools for dressing or cutting the faces of emery-wheels to true them; and it consists of certain improvements, which are fully set forth in the following specification and shown in the accompanying drawings, which form a part thereof.

In the employment of emery grinding-machines for grinding metals it frequently happens that the faces become irregular or grooved, and when so injured they must be dressed or trued up into the desired shape. Special tools are employed for this purpose, which are designed to bite into or chip off fine particles and thus reduce the surface. The tool consists of a handle provided with a rotary cutter which is formed with teeth or projections and is adapted to rotate with the emery-wheel against which it is pressed. By this means the emery-wheel does not readily grind down the cutter, but enables it to perform its duty and remain in operative condition for a long period. Heretofore it has been customary to construct a series of disks provided on their peripheries with projections or teeth by which the wheel was chipped or cut into shape. A number of these disks are usually united together and used in unison with or without intermediate plain disks. The objection to this construction lies chiefly in the fact that if one or more of these projections or teeth are broken the whole disk becomes useless and must be replaced by a new one. This is both expensive and unsatisfactory. Aside from this, such cutters have to be cut from solid disks of steel by a milling process, which is not only slow, but very costly, and as the most hardened steel will not long withstand the action of the emery-wheel the cost of these tools becomes a matter of importance. Again, from the peculiar construction of these milled cutters the thickness of the teeth rapidly increases as the points wear down and they lose their effectiveness. It then becomes necessary to sharpen them, which is a very tedious process. By my invention I overcome these faults by forming my dressing or cutting tool with a series of separate removable teeth, which may be varied on the same instrument for different qualities of work, or removed and replaced by others in case of fracture or wear.

I have the advantage of forming my cutting-teeth of stamped sheet metal, which is not only cheap, but enables me to use a high temper. I form these teeth transversely across the hub of the cutter-wheel, and as they are of substantially uniform thickness throughout they maintain their cutting or chipping qualities until completely used up. I also provide suitable means to keep the cutter-wheel well lubricated to reduce friction and prevent heating.

Referring to the drawings, Figure 1 is a side elevation of an emery-wheel dressing-tool embodying the principles of my invention. Fig. 2 is a plan view of the same. Fig. 3 is a cross-sectional view of the same through the line *x x* of Fig. 2. Fig. 4 is a side elevation of the hub. Fig. 5 is a detailed view of the removed clamping-bolt. Fig. 6 is a perspective view of one of the detached teeth. Fig. 7 is a side elevation of the complete cutting-wheel when oblique teeth are employed. Figs. 8 and 9 are plan views of modified forms of the teeth.

A is the handle of the instrument, terminating in a fork, B, between which the cutting-wheel C is journaled. This handle A may be made in any manner desired. I prefer to make it integral and of cast-iron.

C is the cutting-wheel, and is journaled between the prongs of the fork B by a pin, D, about which it is free to rotate. This pin D is held in place by a set-screw, *d*, or otherwise, if desired.

H is the hub of the cutting-wheel, having a hole, M, in its center and provided with radial slots *h* on its periphery. These slots *h* may be either transverse at right angles to the sides of the hub (see Fig. 2) or diagonal, as shown in Fig. 7. I prefer to make the side edges of the radial slot-divisions slightly curved, so that their tops are narrower than their bases, where they are united to the ring-center of the hub.

E is a tubular clamping-bolt, preferably having a head, F, on one end and a screw-thread, e, on the other. This clamping-bolt E passes through the hole M in the hub H and surrounds the pin D.

I are two clamping-disks, preferably slightly cup-shaped, the object of which is to hold the teeth J firmly in place in the radial slots h. These teeth J are thin flat pieces of metal, preferably of tempered steel. They are provided on the edges near their bases with dovetailed ends K, and may have cutting-points L on their upper edges. The form of these cutting-points may be varied to suit the quality or kind of work to be done, or no points at all may be used. (See Fig. 8.)

G is a nut, which, with the bolt, holds the parts together.

The different pieces are put together as follows: The teeth J are inserted in the slots h, and the clamping-disks I are placed over the hub on each side. The curvature of these disks fits into the dovetailed ends K. The tubular clamping-bolt E is inserted in the hole M of the hub, and the nut G is screwed upon the screw-thread e, binding all of the parts together, forcing the clamping-disks I upon the dovetailed ends and holding the teeth J rigidly in place. The cutting-wheel C, composed of these parts, is then placed on the pin D, which passes through the hole of the tubular clamping-bolt E, and the pin is secured in the prongs of the fork B by the set-screw d. The pin D is preferably grooved at its middle part to form a receptacle, Q, for oil, which may be supplied to it through a longitudinal central hole, q, opening into the periphery of the pin at the groove. This annular groove is shorter than the bolt E, so as to form a good bearing for the bolt on the pin. The pin might be made of uniform diameter and the annular groove put in the interior of the bolt. It is evident that this bolt and the disks and technical hub, all together form what may be termed the "hub" of the cutting-wheel. The instrument when so coupled is ready for use.

P is a tool-rest, upon which the instrument is rested upon its fulcrum b, located on the fork B.

N is the emery-wheel to be cut or dressed into shape, and is rotated by any desirable means. The cutting-wheel C is then brought into contact with the emery-wheel and the projections or unevennesses cut or chipped off as desired.

Should any of the teeth be broken, the clamping-screw E may be loosened and the broken teeth removed and replaced by others, or the teeth may be all changed when worn or when it is desired to perform a different character of work. The tool is equally good for corundum or other similar wheels.

While preferring the details of construction here shown, they are not to be considered as limitations of my invention, and may manifestly be varied in many ways without departing from it.

Having now described my invention, what I claim as new, and desire to secure by Letters Patent, is—

1. A cutter for dressing emery-wheels, consisting of a central hub provided with transverse slots, in combination with cutting-teeth having dovetailed ends, clamping-disks provided with flanged edges adapted to fit over the dovetailed ends of the cutting-teeth, means, substantially as described, to draw said clamping-disks toward each other, and thereby to draw said cutting-teeth downward into the transverse slots of the hub toward the center thereof, shaft D, loosely journaled in said hub, and handle to which said shaft is secured, whereby the hub with its cutting-teeth is free to rotate on said shaft.

2. A cutter for dressing emery-wheels, consisting of a central hub provided with transverse slots and having its edges cut away or slightly beveled, in combination with cutting-teeth having dovetailed ends, clamping-disks provided with flanged edges adapted to fit over the dovetailed ends of the cutting-teeth and cut-away or beveled edges of the central hub, means, substantially as described, to draw said clamping-disks toward each other and thereby to draw said cutting-teeth downward into the transverse slots of the hub toward the center thereof, shaft D, loosely journaled in said hub, and handle to which said shaft is secured, whereby the hub with its cutting-teeth is free to rotate on said shaft.

3. In a cutter for dressing emery-wheels, a central hub, H, having transverse slots h, in combination with cutting-teeth J, having dovetailed ends K, clamping-disks I I, adapted to fit over the dovetailed ends K, means to draw said disks toward each other to clamp the teeth, shaft D, loosely journaled in hub H, and handle A B, to which said shaft is secured, whereby said hub with its cutting-teeth is free to rotate upon the shaft.

4. In a cutter for dressing emery-wheels, a central hub, H, having transverse oblique slots h, in combination with cutting-teeth J, having dovetailed ends K, clamping-disks I I, adapted to fit over the dovetailed ends K, means to draw said disks toward each other to clamp the teeth, shaft D, loosely journaled in hub H, and handle A B, to which said shaft is secured, whereby said hub with its cutting-teeth is free to rotate upon the shaft.

5. In a cutter for dressing emery-wheels, a central hub, H, having transverse slots h, in combination with cutting-teeth J, having dovetailed ends K, clamping-disks I I, adapted to fit over the dovetailed ends K, means to draw said disks toward each other to clamp the teeth, consisting of the bolt E, having head F, and the nut G, shaft D, loosely journaled in hub H, and handle A B, to which said shaft is secured, whereby said hub with its cutting-teeth is free to rotate upon the shaft.

5. In a cutter for dressing emery-wheels, a central hub having beveled or tapering edges and provided with transverse slots, in combination with cutting-teeth adapted to fit into said slots having dovetailed edges, means, substantially as described, to hold said teeth in place upon the hub, and handle A B, provided with a fixed shaft, D, upon which the hub is journaled and free to rotate.

In testimony of which invention I hereunto set my hand.

WM. DIEBEL.

Witnesses:
R. M. HUNTER,
BUTLER KENNER HARDING.